Patented Jan. 9, 1945

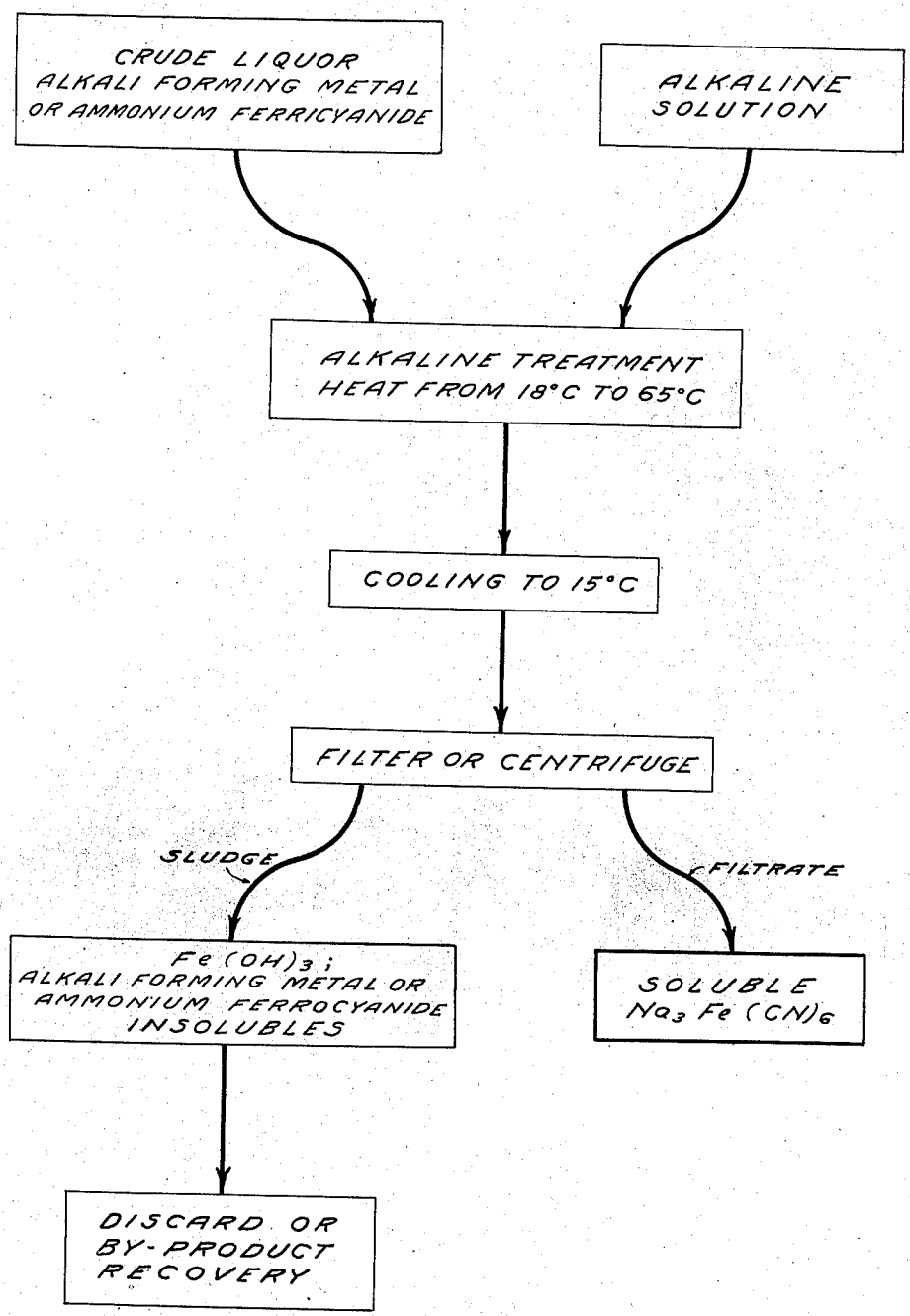

2,366,915

UNITED STATES PATENT OFFICE 2,366,915

PURIFICATION OF FERRICYANIDE

Louis L. Lento, Jr., and Alfred G. Houpt, Springdale, Conn., assignors to American Cyanamid Company, New York, N. Y., a corporation of Maine Application April 2, 1941, Serial No. 386,424

17 Claims. (Cl. 23—84)

This invention relates to a process for the purification of ferricyanide solutions. More particularly it embraces a novel method for clarifying solutions of sodium ferricyanide, especially when contaminated with decomposition products and the products of undesirable side reactions.

Heretofore it has been difficult, if not impossible, to remove such undesirable products as the blue-gree iron complexes frequently found in the ferricyanide compounds commonly used in the photographic arts and in blue printing processes. These impurities are usually present in the form of very finely divided solids which resemble colloidal complexes in their difficulty of removal. In addition, these ferro-ferri complexes discolor the ferricyanide solution causing it to have a muddy blue-green hue instead of the characteristically dark blood-red or ruby-red color of the pure solutions and crystals of ferricyanide. Furthermore, the presence of these undesirable bluegreen complexes is particularly disadvantageous since they are partially precipitated with the ferricyanide salts during the recovery of the latter and especially with the double salts heretofore found particularly desirable for use in photographic and blue printing processes. As a result of this simultaneous precipitation of desirable and undesirable compounds, the crystals of the extracted ferricyanide product are obtained with a coating of the blue-green ferro-ferri decomposition products. This mixed product yields excessively turbid aqueous solutions which vary from blue-green to olive green instead of the more desirable golden yellow to orange-red color deemed more desirable in commercial usage. Moreover, blue prints prepared from such impure or contaminated ferricyanides have been found to undergo undesirable color changes while being developed and the resultant prints are frequently mottled and speckled and in addition fade more rapidly than those prepared from a purer product.

The principal object of this invention is to avoid these disadvantages of the prior commercial practices. Furthermore, it is also an object hereof to prepare an alkali or a double alkali metal ferricyanide by a simple, direct and efficient process. Still another object is to prepare pure sodium ferricyanide as an intermediate in a relatively inexpensive method of preparing a double alkali metal ferricyanide containing potassium.

The invention in its broadest aspect contemplates the purification of crude alkaline forming metal and ammonium ferricyanides, such for example as crude sodium, potassium, calcium and even ammonium ferricyanide solutions and the like, or mixtures thereof, by treating them with caustic soda in excess, or a substance capable of yielding a strongly alkaline solution such as sodium carbonate or ammonium hydroxide, and the like in order to decompose the blue-green iron complexes present and convert them into ferric hydroxide which is then readily removed by filtration.

The flow sheet diagrammatically illustrates the process.

In general, the commercial production of sodium ferricyanide is carried out by oxidizing sodium ferrocyanide by means of chlorine. During this chlorination step, chlorides such as sodium chloride and complex ferro-ferri color bodies are formed. The complex ferro-ferri color bodies and other insolubles resulting from the chlorination step are undesirable impurities. Their removal is effected by adding enough of an alkaline substance to raise the pH of the solution to 9.3 or higher. This decomposes the ferro-ferri complexes and converts them into ferric hydroxide or similar easily removable compounds. A filtration step is then utilized to remove the iron hydroxide and other insolubles.

The color bodes may be prevented from forming in the original chlorination step by maintaining the pH of the solution during the chlorination from 8 to 9. However, after the color bodies have been formed, it is necessary to maintain a pH of at least 9.3 in the solution in order to decompose the ferro-ferri color bodies.

Briefly, the present invention in a preferred embodiment contemplates maintaining the hydrogen ion concentration of a crude sodium ferricyanide solution at a pH of at least 9.3 or higher, without regard to an upper limit of pH which may range through 10 and even higher, a pH of 11.2 having been found to result in little or no detrimental effect. This alkaline solution is then heated to not exceeding 65° C., after which it is cooled to approximately 15° C. and ferric hydroxide and such insolubles as sodium ferrocyanide are removed by filtration. The filtrate is a clarified solution of sodium ferricyanide stripped of the blue-green complexes and can be used as such or as an intermediate for the production of such valuable compounds as potassium ferricyanide, or a double alkali metal ferricyanide by reacting the filtrate with such salts as potassium chloride and double calcium-potassium or calcium-ammonium ferricyanides by adding calcium chloride together with potassium chloride or ammonium chloride, respectively.

The following examples are given in order to facilitate a more complete understanding of the process embraced by the invention. The examples given in detail are, however, merely illustrative and not limitative embodiments.

Example 1

A crude sodium ferricyanide solution containing 27% of that salt and 4% of sodium chloride and having a pH of about 8.3 was treated with a 25% caustic soda solution with agitation until the resulting solution had a pH of 9.5. Then 0.75% excess of caustic soda based on the weight of the batch being treated was added to insure the decomposition of the ferro-ferri complexes. This reaction mixture was heated to not exceeding 65° C. The color of the initial crude ferricyanide solution was an opalescent green, due to the complexes present, whereas after the caustic soda treatment and a filtering step to remove ferric hydroxide, sodium ferrocyanide and other insolubles, the color was a clear ruby red. The removal of these undesirable products and the subsequent filtration step are greatly facilitated by cooling the reaction mixture to 15° C. prior to filtration. The filter cake may be discarded or treated for subsequent by-product recovery.

Example 2

100 cc. of an aqueous solution of crude sodium ferricyanide containing 27 to 28% of the solute and having a dark green cast and a pH of 8.4 to 8.7 was mixed with a sufficient quantity of a 25% aqueous solution of sodium hydroxide to to raise the pH of the mixture to between 9.3 and 9.5 at 25° C. A slight excess of sodium hydroxide was then added and the mixture heated to 65° C. to convert the ferro-ferri complexes into ferric hydroxide and ferrocyanides slightly soluble in the mother liquor present. After cooling the mother liquor, these precipitates were then readily removed by filtration, and the filter cake consisting of ferric hydroxide, sodium ferrocyanide and other insolubles resulting from the decomposition of the blue-green colloidal iron complexes was discarded. The filtrate consisting of a clear, deep orange colored solution of sodium ferricyanide was stable and underwent no further color change even on prolonged storage. The clear filtrate, free of colloids, contained sodium ferricyanide in such condition as to serve as a valuable intermediate even though some sodium chloride and sodium hydroxide were present. It could be used for the preparation of simple ferricyanide such as $K_3Fe(CN)_6$ as well as mixed ferricyonide salts such as the potassium and sodium double salts which are now finding such favorable use in the blue printing arts because of their content of 105% of ferricyanide compared to potassium ferricyanide as a basis.

Example 3

A crude solution of ferricyanide containing from 27 to 28% of sodium ferricyanide was adjusted so as to have a pH of 11.85 by adding sodium hydroxide. These reactants were then heated at 65° C. for several minutes during which interval the color changed from blue-green to bright blood-red or ruby red. A red-brown precipitate of ferric hydroxide is formed. Cooling the solution to about 15° C. facilitates the precipitation and removal of any ferrocyanide present. These precipitates are readily separated by filtration in a centrifuge. The filtrate, a bright ruby red solution, was clear and suitable for further reaction, as with potassium chloride in order to obtain commercially useful products.

Example 4

A series of runs were made to determine the optimum concentration of sodium hydroxide necessary for effecting a commercially feasible destruction of the complex ferro-ferri compounds. To this end, concentrations of sodium hydroxide varying from 0.5% to 2.5% were prepared by adding appropriate quantities of a 10% solution of sodium hydroxide as shown in the table below to previously oxidized turbid sodium ferricyanide solutions containing the undesirable iron complexes. In each case, the reaction mixture was heated to 65° C. in a water bath. The solutions changed from blue-green to bright ruby red in the time intervals indicated.

|   | Per cent NaOH | Grams of 10% NaOH | Grams of 27–28% $Na_3Fe(CN)_6$ solution | Time for color change |
| --- | --- | --- | --- | --- |
| 1 | 0.52 | 5.5 | 100.0 | No change after ½ hour. |
| 2 | 0.75 | 7.5 | 92.5 | 6 minutes. |
| 3 | 1.00 | 10.0 | 90.0 | 3½ minutes. |
| 4 | 1.50 | 15.0 | 85.0 | 1 minute. |
| 5 | 2.00 | 20.0 | 80.0 | Do. |
| 6 | 2.50 | 25.0 | 75.0 | Do. |

The solution to which 0.52% of NaOH was added showed no change in color even after ½ hour heating at 65° C. After an additional ½ hour heating at 75° C. the only change observed was the formation of white curds while the solution assumed a brown cast. Apparently additions of up to 0.52% NaOH are insufficient to destroy the iron complexes, whereas additions of 1 to 1.5% of sodium hydroxide are sufficient, although more may be added without unduly impairing the efficiency of the process, as shown in the following example:

Example 5

The high efficiency of the caustic treatment is well illustrated by the following example showing the relatively small amount of ferricyanide destroyed or lost during the caustic treatment. Moreover the resulting liquors were stable on storage.

540 g. of a 27 to 28% aqueous solution of $Na_3Fe(CN)_6$ was heated to 65° C. and 60 g. of a 10% solution of NaOH was added. 3½ minutes after mixing, the blue green color changed to red. Samples taken at the times indicated showed the following relatively small decomposition of ferricyanide:

| Sample taken | Time | Percent of original ferricyanide remaining |
| --- | --- | --- |
|  | *Minutes* |  |
| Before caustic addition | 0 | 100.0 |
| One minute after addition | 1 | 99.8 |
| After color change | 10 | 98.5 |
| Do | 15 | 98.5 |
| Do | 20 | 98.5 |
| Do | 25 | 98.3 |
| After cooling and storage | 1,080 | 98.5 |
| Do | 2,520 | 98.5 |
| Do | 10,200 | 97.7 |

Thus, any decomposition of the ferricyanide by the alkali is effected virtually in the first few minutes. After a considerable time interval the amount of ferricyanide lost because of this purification step amounted to but 1.5% of the total present in solution.

Example 6

900 parts of a 27 to 28% aqueous solution of $Na_3Fe(CN)_6$ and 100 to 200 parts of wash water previously used on a double alkali metal ferricyanide filter cake together with a sufficient amount of a 25% caustic soda solution to give a 1% NaOH solution, were heated to 65° C. with the aid of a steam jacket. The heating was continued with agitation until the liquor became a bright red color, adding more caustic if necessary. This reaction product was cooled and the digestion of the ferri complexes was halted by applying cold water to the jacket and using a vacuum for evaporating and cooling the solution to 20° to 25° C. The resultant product was a slurry including among other things, the precipitate formed from the decomposed color bodies. This was readily filtered and separated in a centrifuge leaving as the filter cake, sodium ferrocyanide and small amounts of ferric hydroxide.

The filtrate, containing principally $Na_3Fe(CN)_6$, is a highly desirable intermediate for the preparation of simple and mixed ferricyanides as above described.

Example 7

580 grams of an 18-20% aqueous solution of a crude calcium ferricyanide, $Ca_3(Fe(CN)_6)_2$, was heated to 65° C. and 20 grams of commercial slaked lime, $Ca(OH)_2$, was added with vigorous agitation. These reactants were heated at 65° C. for several minutes during which interval the color changed from blue-green to red. Flocs of red-brown $Fe(OH)_3$ settled out. The suspension was cooled to 15° C. and filtered to remove $Fe(OH)_3$, and other precipitated materials. The filtrate was a clear bright ruby red ferricyanide solution suitable for further reaction.

Example 8

570 grams of a 15% aqueous solution of crude ammonium ferricyanide, $(NH_4)_3Fe(CN)_6$, was heated to 65° C. and 30 grams of a 28% solution of $NH_3$ was added. These reactants were heated at 65° C. for several minutes during which interval the color changed from blue-green to bright blood-red or ruby red. Flocs of red-brown $Fe(OH)_3$ settled out. The suspension was cooled to 15° C. and filtered to remove $Fe(OH)_3$ and other precipitated materials. The filtrate was a clear, bright ruby-red solution of ferricyanide suitable for further reaction.

Example 9

In order to show more clearly the advantage of the process of this invention from one particular point of view namely purity of product, two runs were made wherein mixed ferricyanides were prepared from sodium ferricyanide and potassium chloride. The product had the following content of ferri- and ferrocyanides:

|  | Calculated as equivalent percent of $K_2NaFe(CN)_6$ | |
| --- | --- | --- |
|  | Ferricyanide | Ferrocyanide |
| *Example A* | | |
| Untreated $K_3Fe(CN)_6$ solution | 31.18 | 0.32 |
| Filtrate from crude $K_2NaFe(CN)_6$ | 6.47 | 0.63 |
| Crystals of crude $K_2NaFe(CN)_6$ | 94.60 | 0.14 |
| *Example (b)* | | |
| Caustic treated $K_3Fe(CN)_6$ solution | 29.40 | 0.00 |
| Filtrate from crude $K_2NaFe(CN)_6$ | 5.13 | 0.02 |
| Crystals of crude $K_2NaFe(CN)_6$ | 99.0 | 0.00 |

Thus, as a result of the caustic treatment, the ferrocyanide remained soluble in the filtrate and hence could be separated completely by subsequently recrystallizing the ferricyanide. This gave a very pure ferricyanide product. Simultaneously, the removal of the blue-green color bodies and the recovery of a stable ferricyanide compound was effected.

In addition to the crude ferricyanides mentioned more specifically in the above examples various other alkaline forming metal ferricyanides as well as ammonium ferricyanides can be purified with the aid of an alkaline substance such as an alkaline earth hydroxide, an alkaline salt, an alkali metal hydroxide, and the like. Among such compounds are the various mixed alkaline forming metal and ammonium ferricyanides, or the double salts such as calcium potassium ferricyanide, calcium sodium ferricyanide, calcium ammonium ferricyanide and the like, each may be reacted with a corresponding alkaline substance to remove undesirable impurities and to give a filtrate and hence a product having such desirable properties as those above described.

It is to be particularly noted that although for ease of description and economy of production sodium hydroxide was chosen as the most frequently used alkaline substance for illustrating specific embodiments of the process of this invention various others may be used. Thus, potassium hydroxide, potassium carbonate, sodium carbonate as well as the more complex ammonium compounds can be used to purify such compounds as the sodium and/or potassium ferricyanides and various other alkaline forming metal and ammonium ferricyanides in addition to those given above.

It is to be understood that the examples given are merely illustrative and not limitative of the invention which is to be construed broadly and restricted solely by the scope of the appended claims.

We claim:

1. The method of removing color bodies from and purifying a ferricyanide in aqueous solution which comprises reacting an alkaline substance therewith at a pH of at least 9.0 and at a temperature of substantially 65° C., removing the color bodies as ferric hydroxide and recovering the clarified ferricyanide solution.

2. The method of claim 1 in which the alkaline substance is an alkali metal hydroxide.

3. The method of claim 1 in which the alkaline substance is sodium hydroxide.

4. The method of claim 1 in which the alkaline substance is ammonium hydroxide.

5. A method of removing color bodies from and purifying ferricyanides in aqueous solution which comprises adding an alkaline substance until the pH is at least 9.0, reacting the mixture at a temperature of substantially 65° C., removing the color bodies as precipitated ferric hydroxide, and recovering the clarified solution.

6. A method of removing color bodies from and purifying ferricyanides in aqueous solution which comprises adding an alkaline substance until the pH is at least 9.0, reacting the mixture at a temperature of substantially 65° C., cooling the reaction mixture, removing color bodies as ferrocyanides and ferric hydroxide, and recovering the clarified solution.

7. The method of removing color bodies from and purifying sodium ferricyanide in aqueous solution which comprises reacting sodium hydroxide therewith at a pH of at least 9.0 and at a temperature of substantially 65° C., removing the color bodies as a precipitate of ferric hydroxide and other insolubles formed and recovering the clarified sodium ferricyanide solution.

8. A method of removing color bodies from and purifying ferricyanides in aqueous solution which comprises adding ammonium hydroxide until the pH is at least 9.0, reacting the mixture at a temperature of substantially 65° C., removing the color bodies as ferric hydroxide, and extracting the clarified ferricyanide solution.

9. The method of removing color bodies from and purifying a double salt of a ferricyanide in aqueous solution which comprises adding an alkaline substance until the pH is at least 9.0, reacting the mixture at a temperature of substantially 65° C., cooling the reaction mixture, removing color bodies as ferrocyanides and ferric hydroxide, and extracting the clarified ferricyanide double salt.

10. The method of removing color bodies from and purifying a double alkali metal salt of a ferricyanide in aqueous solution which comprises adding an alkaline substance until the pH is at least 9.0, reacting the mixture at a temperature of substantially 65° C., cooling the reaction mixture, removing color bodies as ferrocyanides and ferric hydroxide, and extracting the clarified ferricyanide double salt.

11. The method of removing colloidal color bodies from a double salt of a ferricyanide in aqueous solution which comprises adding an alkaline substance until the pH is at least 9.0, reacting the mixture at a temperature of substantially 65° C., cooling the reaction mixture, removing color bodies as ferrocyanides and ferric hydroxide, and extracting the clarified ferricyanide double salt.

12. The method of removing color bodies from and purifying a double salt of a crude alkaline forming metal and ammonium ferricyanide which comprises adding an alkaline substance until the pH is at least 9.0, reacting the mixture at a temperature of substantially 65° C., cooling the reaction mixture, removing color bodies as ferrocyanides and ferric hydroxide, and extracting the clarified ferricyanide double salt.

13. The method of removing color bodies from and purifying a double salt of a crude alkaline forming metal and ammonium ferricyanide in aqueous solution, the metal being selected from the group consisting of sodium, potassium and calcium, which comprises adding an alkaline substance until the pH is at least 9.0, reacting the mixture at a temperature of substantially 65° C., cooling the reaction mixture, removing color bodies as ferrocyanides and ferric hydroxide, and extracting the clarified ferricyanide double salt.

14. The method of removing color bodies from and purifying ferricyanides in aqueous solution which comprises adding an alkaline substance until the pH is at least 9.0, reacting the mixture at a temperature of substantially 65° C., cooling the reaction mixture to about 15° C., removing color bodies as ferrocyanides and ferric hydroxide, and extracting the clarified ferricyanide solution.

15. The method of removing color bodies from and purifying ferricyanides in aqueous solution which comprises adding an alkaline substance until the pH is at least 9.0, reacting the mixture at a temperature of substantially 65° C., cooling the reaction mixture and halting the digestion of the ferro-ferri complexes by vacuum evaporation, removing color bodies as ferrocyanides and ferric hydroxide, and extracting the clarified ferricyanide solution.

16. The method of removing color bodies from and purifying ferricyanides in aqueous solution which comprises the steps of treating a crude alkali metal ferricyanide solution containing at least 25% thereof with a caustic soda solution until the pH is at least 9.0 and heating the mixture to a temperature of substantially 65° C. to insure the decomposition of the ferroferri complex color bodies, cooling the resultant mass to substantially 15° C. to facilitate the precipitation of the complex color bodies without freeing the alkali metal ferricyanide from solution, separating the color bodies as a ferric hydroxide and recovering the clarified alkali metal ferricyanide solution.

17. The method of removing color bodies from and purifying ferricyanides in aqueous solution which comprises the steps of treating a crude sodium ferricyanide solution containing at least 25% thereof with a caustic soda solution until the pH is substantially 9.5 and heating the mixture to a temperature of substantially 65° C. to insure the decomposition of the ferroferri complex color bodies, cooling the resultant mass to substantially 15° C. to facilitate the precipitation of the complex color bodies without freeing the sodium ferricyanide from solution, separating the color bodies as a ferric hydroxide precipitate and recovering the clarified sodium ferricyanide solution.

LOUIS L. LENTO, JR.
ALFRED G. HOUPT.